United States Patent
Mueller et al.

(10) Patent No.: US 10,404,007 B2
(45) Date of Patent: Sep. 3, 2019

(54) WIRED PIPE COUPLER CONNECTOR

(71) Applicant: Baker Hughes, LLC, Houston, TX (US)

(72) Inventors: Stephan Mueller, Hannover (DE); Rene Schulz, Hambuhren (DE); Robert Buda, Celle (DE); Henning Rahn, Celle (DE); Ingo Roders, Seelze (DE)

(73) Assignee: NextStream Wired Pipe, LLC, Oklahoma City, OK (US)

( * ) Notice: Subject to any disclaimer, the term of this patent is extended or adjusted under 35 U.S.C. 154(b) by 0 days.

(21) Appl. No.: 15/705,453

(22) Filed: Sep. 15, 2017

(65) Prior Publication Data

US 2018/0006395 A1    Jan. 4, 2018

Related U.S. Application Data

(63) Continuation of application No. 14/736,944, filed on Jun. 11, 2015, now Pat. No. 9,768,546.

(51) Int. Cl.
| | | |
|---|---|---|
| *H01R 4/60* | (2006.01) | |
| *H01R 13/52* | (2006.01) | |
| *E21B 17/02* | (2006.01) | |
| *E21B 17/042* | (2006.01) | |
| *H01F 38/14* | (2006.01) | |
| *H01R 9/05* | (2006.01) | |
| *H01R 13/533* | (2006.01) | |
| *G01V 11/00* | (2006.01) | |

(52) U.S. Cl.
CPC ....... *H01R 13/5219* (2013.01); *E21B 17/028* (2013.01); *E21B 17/042* (2013.01); *G01V 11/002* (2013.01); *H01F 38/14* (2013.01); *H01R 9/05* (2013.01); *H01R 13/533* (2013.01); *H01F 2038/146* (2013.01)

(58) Field of Classification Search
CPC ..... H01R 13/005; H01R 13/523; F16L 25/01; A47L 9/246; E21B 17/028
USPC ........................................ 439/191, 192, 194
See application file for complete search history.

(56) References Cited

U.S. PATENT DOCUMENTS

| | | |
|---|---|---|
| 2,178,931 A | 11/1939 | Crites et al. |
| 2,379,800 A | 7/1945 | Hare |
| 3,253,245 A | 5/1966 | Brandt |

(Continued)

FOREIGN PATENT DOCUMENTS

| | | |
|---|---|---|
| WO | 2012038468 A1 | 3/2012 |
| WO | 2015021106 A1 | 2/2015 |

OTHER PUBLICATIONS

European Search Report dated Jan. 17, 2019, in corresponding European Patent Application 16808287.3.

*Primary Examiner* — Hien D Vu

(74) *Attorney, Agent, or Firm* — McAfee & Taft

(57) ABSTRACT

A connector for use in connecting a communication element to a transmission line in a wired pipe segment includes a first female end adapted to surround and make electrical contact with a coupler connection that extends away from a communication element of the coupler; a second female end adapted to receive an inner conductor of a coaxial cable; and an inner connection element formed on an inner surface of the connector adapted to electrically connect the coupler connection and the inner conductor, the inner connection element formed such that it does not completely surround at least one of the inner conductor and the coupler connection.

7 Claims, 5 Drawing Sheets

(56) References Cited

U.S. PATENT DOCUMENTS

| | | | |
|---|---|---|---|
| 4,117,287 | A | 9/1978 | Walker et al. |
| 4,445,734 | A | 5/1984 | Cunningham |
| 4,585,287 | A | 4/1986 | Ramsey et al. |
| 4,792,309 | A | 12/1988 | Chu |
| 5,070,940 | A | 12/1991 | Conner et al. |
| 5,221,214 | A | 6/1993 | Martin |
| 5,318,460 | A | 6/1994 | Gilbert |
| 5,389,003 | A | 2/1995 | Van Steenwyk et al. |
| 5,700,161 | A | 12/1997 | Plummer et al. |
| 5,735,695 | A | 4/1998 | Heinrich |
| 5,823,256 | A | 10/1998 | Moore |
| 5,833,490 | A * | 11/1998 | Bouldin ............... E21B 17/023 439/462 |
| 5,865,654 | A | 2/1999 | Shimirak et al. |
| 5,869,784 | A | 2/1999 | Shinchi |
| 5,967,816 | A | 10/1999 | Sampa et al. |
| 6,027,373 | A | 2/2000 | Gray et al. |
| 6,062,905 | A | 5/2000 | Sampa et al. |
| 6,125,533 | A | 10/2000 | Warner et al. |
| 6,142,237 | A | 11/2000 | Christmas et al. |
| 6,288,548 | B1 | 9/2001 | Thompson et al. |
| 6,392,317 | B1 | 5/2002 | Hall et al. |
| 6,398,593 | B1 | 6/2002 | Yeh |
| 6,407,722 | B1 | 6/2002 | Bogner et al. |
| 6,443,780 | B2 | 9/2002 | Wilbourn et al. |
| 6,565,129 | B2 | 5/2003 | Surjaatmadja |
| 6,568,945 | B2 | 5/2003 | Whybrow |
| 6,670,880 | B1 | 12/2003 | Hall et al. |
| 6,676,447 | B1 | 1/2004 | Knox |
| 6,766,853 | B2 | 7/2004 | Restarick et al. |
| 6,776,636 | B1 | 8/2004 | Cameron et al. |
| 6,780,037 | B1 | 8/2004 | Parmeter et al. |
| 6,790,082 | B2 | 9/2004 | Obayashi |
| 6,800,809 | B2 | 10/2004 | Moe et al. |
| 6,811,187 | B2 | 11/2004 | Otten et al. |
| 6,821,147 | B1 | 11/2004 | Hall et al. |
| 6,830,467 | B2 | 12/2004 | Hall et al. |
| 6,836,218 | B2 | 12/2004 | Frey et al. |
| 6,844,498 | B2 * | 1/2005 | Hall ............... E21B 17/003 174/75 C |
| 6,929,493 | B2 | 8/2005 | Hall et al. |
| 6,945,802 | B2 | 9/2005 | Hall et al. |
| 6,968,611 | B2 | 11/2005 | Hall et al. |
| 6,995,684 | B2 | 2/2006 | Clark |
| 7,128,619 | B1 | 10/2006 | Muench, Jr. |
| 7,362,235 | B1 | 4/2008 | Normann et al. |
| 7,405,358 | B2 | 7/2008 | Emerson |
| 7,488,194 | B2 | 2/2009 | Hall et al. |
| 7,535,377 | B2 | 5/2009 | Hall et al. |
| 7,565,936 | B2 | 7/2009 | Zhang et al. |
| 7,598,886 | B2 | 10/2009 | Hall et al. |
| 7,649,475 | B2 * | 1/2010 | Hall ............... E21B 17/028 166/380 |
| 7,692,428 | B2 | 4/2010 | Clark et al. |
| 7,806,191 | B2 | 10/2010 | Braden et al. |
| 8,033,329 | B2 | 10/2011 | Montgomery et al. |
| 8,049,506 | B2 | 11/2011 | Lazarev |
| 8,066,033 | B2 | 11/2011 | Quigley et al. |
| 8,109,329 | B2 | 2/2012 | Bray et al. |
| 8,187,687 | B2 | 5/2012 | Wideman et al. |
| 8,242,928 | B2 | 8/2012 | Prammer |
| 8,297,345 | B2 | 10/2012 | Emerson |
| 8,635,770 | B2 | 1/2014 | Warner |
| 8,826,972 | B2 | 9/2014 | Flint et al. |
| 8,986,028 | B2 | 3/2015 | Mueller et al. |
| 8,991,507 | B2 | 3/2015 | Rodney et al. |
| 9,052,043 | B2 * | 6/2015 | Mueller ............... F16L 25/01 |
| 9,291,005 | B2 | 3/2016 | Buda et al. |
| 9,303,464 | B2 | 4/2016 | Peters |
| 9,768,546 | B2 * | 9/2017 | Mueller ............. H01R 13/5219 |
| 2002/0126021 | A1 | 9/2002 | Vinegar et al. |
| 2002/0193004 | A1 | 12/2002 | Boyle et al. |
| 2004/0060708 | A1 | 4/2004 | Clark et al. |
| 2005/0039912 | A1 | 2/2005 | Hall et al. |
| 2005/0070144 | A1 * | 3/2005 | Hall ............... E21B 17/003 439/191 |
| 2005/0095827 | A1 | 5/2005 | Hall et al. |
| 2005/0236160 | A1 | 10/2005 | Hall et al. |
| 2006/0108803 | A1 | 5/2006 | Reynolds, Jr. |
| 2006/0158296 | A1 | 7/2006 | Hall et al. |
| 2006/0283606 | A1 | 12/2006 | Partouche et al. |
| 2007/0149033 | A1 | 6/2007 | Hanks |
| 2007/0167051 | A1 | 7/2007 | Reynolds, Jr. |
| 2008/0166917 | A1 | 7/2008 | Hall et al. |
| 2008/0251247 | A1 | 10/2008 | Flint et al. |
| 2009/0289808 | A1 | 11/2009 | Prammer |
| 2010/0175890 | A1 | 7/2010 | Bray et al. |
| 2010/0264650 | A1 | 10/2010 | Braden et al. |
| 2011/0315399 | A1 | 12/2011 | Rodney et al. |
| 2012/0081122 | A1 | 4/2012 | Frey |
| 2012/0176138 | A1 | 7/2012 | Prammer |
| 2014/0144614 | A1 | 5/2014 | Buda et al. |
| 2014/0148029 | A1 | 5/2014 | Mueller et al. |
| 2014/0290930 | A1 | 10/2014 | Peters |

* cited by examiner

US 10,404,007 B2

WIRED PIPE COUPLER CONNECTOR

CROSS REFERENCE TO RELATED APPLICATIONS

This application is a divisional of U.S. application Ser. No. 14/736,944 filed on Jun. 11, 2015, the disclosure of which is incorporated by reference herein in its entirety.

BACKGROUND

During subterranean drilling and completion operations, a pipe or other conduit is lowered into a borehole in an earth formation during or after drilling operations. Such pipes are generally configured as multiple pipe segments to form a "string", such as a drill string or production string. As the string is lowered into the borehole, additional pipe segments are coupled to the string by various coupling mechanisms, such as threaded couplings.

Various power and/or communication signals may be transmitted through the pipe segments via a "wired pipe" configuration. Such configurations include electrical, optical or other conductors extending along the length of selected pipe segments. The conductors are operably connected between pipe segments by a variety of coupling configurations.

One such coupling configuration includes a threaded male-female configuration often referred to as a pin box connection. The pin box connection includes a male member, i.e., a "pin" that includes an exterior threaded portion, and a female member, i.e., a "box", that includes an interior threaded portion and is configured to receive the pin in a threaded connection.

Some wired pipe configurations include a transmission device mounted on the tip of the pin as well as in the box end. The transmission device, or "coupler," can transmit power, data or both to an adjacent coupler. The coupler in the pin end is typically connected via a coaxial cable to the coupler in the box end.

BRIEF DESCRIPTION

According to one embodiment, a wired pipe segment is disclosed. The segment includes a body extending from a box end to a pin end and a coupler located in one of the box and pin ends. The coupler includes a communication element and a coupler connection in electrical communication therewith and extending away from the communication element. The segment also includes a transmission line extending away from the coupler towards the other of the box and pin end, the transmission line including an inner conductor surrounded by a dielectric material, the inner conductor extending beyond an end of the dielectric material. The segment also includes a hollow connector that electrically connects the coupler to the transmission line, the hollow connector including first and second female ends that respectively receive the inner conductor and a portion of a coupler connection and an inner connection element formed on an inner surface of the hollow connector that electrically connects the inner conductor and the portion of a coupler connection, wherein the inner connection element is formed such that it does not completely surround at least one of the inner conductor and the portion of a coupler connector.

Also disclosed is a connector for use in connecting a communication element to a transmission line in a wired pipe segment. The connector includes a first female end adapted to surround and make electrical contact with a coupler connection that extends away from a communication element of the coupler; a second female end adapted to receive an inner conductor of a coaxial cable; an inner connection element formed on an inner surface of the connector adapted to electrically connect the coupler connection and the inner conductor, the inner connection element formed such that it does not completely surround at least one of the inner conductor and the coupler connection.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system, apparatus and method are presented herein by way of exemplification and not limitation with reference to the Figures.

Figure 1:
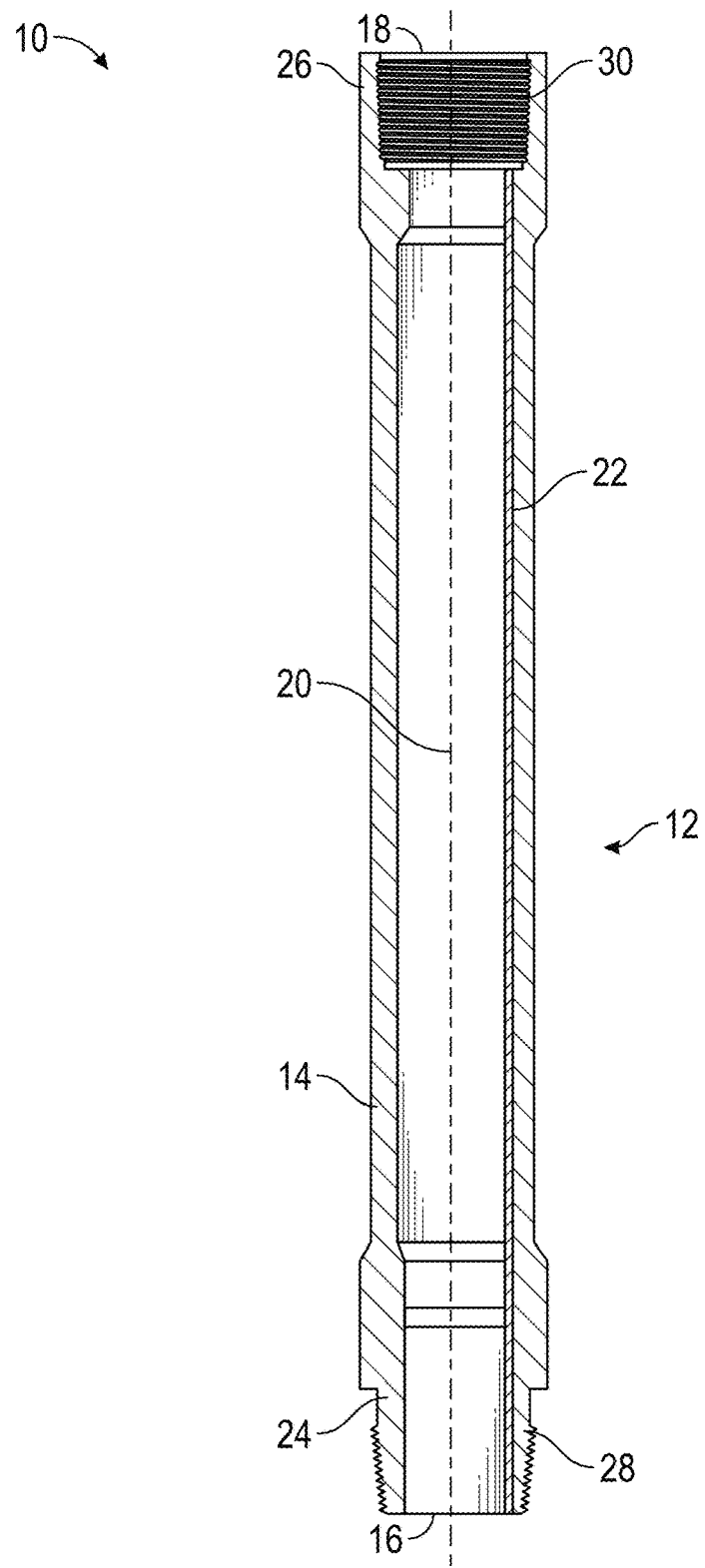
FIG. 1 depicts an exemplary embodiment of a wired pipe segment of a well drilling and/or logging system.

Referring to FIG. 1, an exemplary embodiment of a portion of a well drilling, logging and/or production system 10 includes a conduit or string 12, such as a drillstring or production string, that is configured to be disposed in a borehole for performing operations such as drilling the borehole, making measurements of properties of the borehole and/or the surrounding formation downhole, or facilitating gas or liquid production.

For example, during drilling operations, drilling fluid or drilling "mud" is introduced into the string 12 from a source such as a mud tank or "pit" and is circulated under pressure through the string 12, for example via one or more mud pumps. The drilling fluid passes into the string 12 and is discharged at the bottom of the borehole through an opening in a drill bit located at the downhole end of the string 12. The drilling fluid circulates uphole between the string 12 and the borehole wall and is discharged into the mud tank or other location.

The string 12 may include at least one wired pipe segment 14 having an uphole end 18 and a downhole end 16. As described herein, "uphole" refers to a location near the point where the drilling started relative to a reference location when the segment 14 is disposed in a borehole, and "downhole" refers to a location away from the point where the drilling started along the borehole relative to the reference location. It shall be understood that the uphole end 18 could be below the downhole end 16 without departing from the scope of the disclosure herein.

At least an inner bore or other conduit 20 extends along the length of each segment 14 to allow drilling mud or other fluids to flow therethrough. A transmission line 22 is located within the wired segment 14 to provide protection for electrical, optical or other conductors to be disposed along the wired segment 14. In one embodiment, the transmission line 22 is a coaxial cable. In another embodiment, the transmission line 22 is formed of any manner of carrying power or data, including, for example, a twisted pair. In the case where the transmission line 22 is a coaxial cable it may include an inner conductor surrounded by a dielectric material. The coaxial cable may also include a shield layer that surrounds the dielectric. In one embodiment, the shield layer is electrically coupled to an outer conductor that may be formed, for example, by a rigid or semi-rigid tube of a conductive material.

The segment 14 includes a downhole connection 24 and an uphole connection 26. The segment 14 is configured so that the uphole connection 26 is positioned at an uphole location relative to the downhole connection 24. The downhole connection 24 includes a male coupling portion 28 having an exterior threaded section, and is referred to herein as a "pin end" 24. The uphole connection 26 includes a female coupling portion 30 having an interior threaded section, and is referred to herein as a "box end" 26.

The pin end 24 and the box end 26 are configured so that the pin end 24 of one wired pipe segment 14 can be disposed within the box end 26 of another wired pipe segment 14 to effect a fixed connection therebetween to connect the segment 14 with another adjacent segment 14 or other downhole component. In one embodiment, the exterior of the male coupling portion 28 and the interior of the female coupling portion 30 are tapered. Although the pin end 24 and the box end 26 are described has having threaded portions, the pin end 24 and the box end 26 may be configured to be coupled using any suitable mechanism, such as bolts or screws or an interference fit.

In one embodiment, the system 10 is operably connected to a downhole or surface processing unit which may act to control various components of the system 10, such as drilling, logging and production components or subs. Other components include machinery to raise or lower segments 14 and operably couple segments 14, and transmission devices. The downhole or surface processing unit may also collect and process data generated by the system 10 during drilling, production or other operations.

As described herein, "drillstring" or "string" refers to any structure or carrier suitable for lowering a tool through a borehole or connecting a drill bit to the surface, and is not limited to the structure and configuration described herein. For example, a string could be configured as a drillstring, hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's and drill strings.

Figure 2:
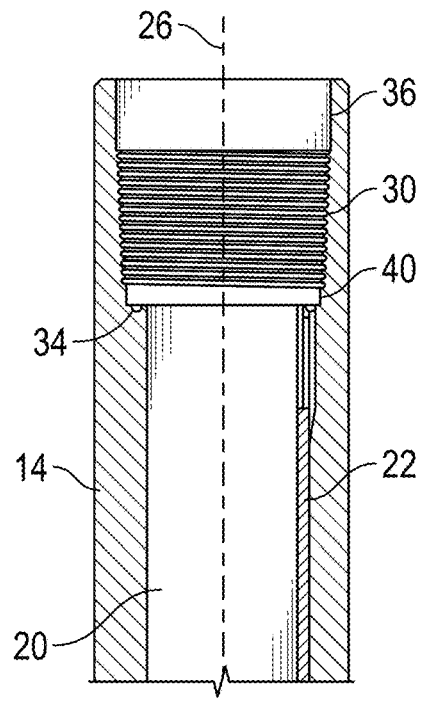
FIG. 2 depicts an exemplary embodiment of a box connector of the segment of FIG. 1.
Figure 3:
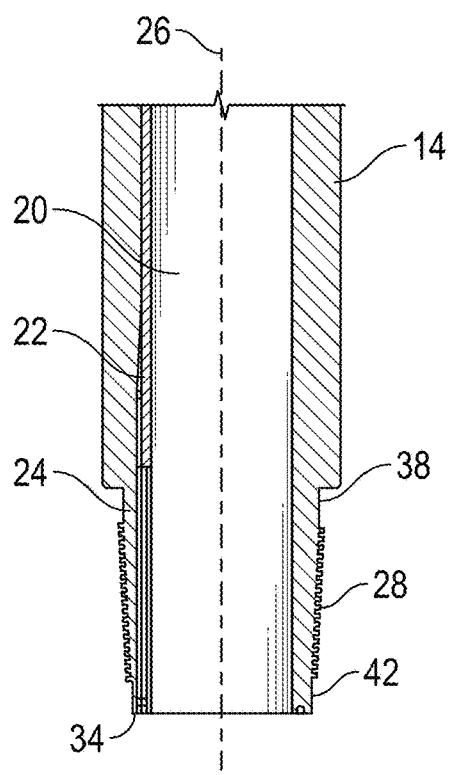
FIG. 3 depicts an exemplary embodiment of a pin connector of the segment of FIG. 1.

Referring to FIGS. 2 and 3, the segment 14 includes at least one transmission device 34 (also referred to as a "coupler" herein) disposed therein and located at the pin end 24 and/or the box end 26. The transmission device 34 is configured to provide communication of at least one of data and power between adjacent segments 14 when the pin end 24 and the box end 26 are engaged. The transmission device 34 may be of any suitable type, such as an inductive coil, direct electrical contacts and an optical connection ring. The coupler may be disposed at the inner or outer shoulder. Further, the transmission device 34 may be a resonant coupler. The each of these types of couplers shall be referred to as including a communication element that allows it to communicate a signal to another coupler. It shall be understood that the transmission device 34 could also be included in a repeater element disposed between adjacent segments 14 (e.g., within the box end). In such a case, the data/power is transmitted from the transmission device in one segment, into the repeater. The signal may then be passed "as is," amplified, and/or modified in the repeater and provided to the adjacent segment 14.

Regardless of the configuration, it shall be understood that each transmission device 34 can be connected to one or more transmission lines 22. Embodiments disclosed herein are directed to a connector that is used to connect a transmission device to a transmission line. The connection could be galvanic or capacitive, for example. The term "direct" as used with respect to a connection shall include a galvanic connection.

Figure 4:
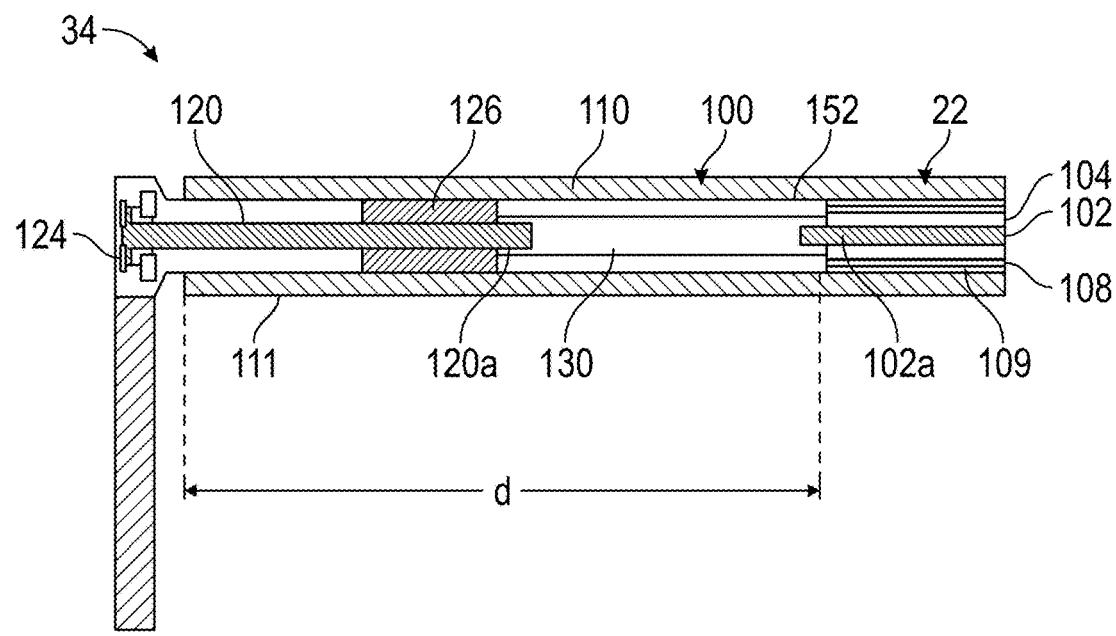
FIG. 4 is a partial side view of a coupler connected to a transmission line via a connector according to one embodiment.

In more detail, and referring now to FIG. 4, a transmission device 34 is shown coupled to a transmission line 22 by a connector 100. The illustrated transmission line 22 is a coaxial cable that includes an inner conductor 102 surrounded by a dielectric material 104. The transmission line 22 may also include an optional shield layer 108 that could be formed, for example, by a braided metal or metal foil layer. Regardless of how formed, if present, the shield layer 108 may be surrounded by an optional insulating layer 109 or may be electrically coupled to an outer conductor 110 in one embodiment. The outer conductor 110 can be rigid or semi-rigid and is formed of metal in one embodiment. The outer conductor 110 can extend the entire length of the transmission line 22 (e.g., from one coupler 34 at one end of a drill pipe segment to another coupler 34 at another end of the drill pipe segment). As an alternative, the outer conductor 110 may only surround regions of the transmission line 22.

Of course, the exact configuration of the transmission line could be varied. For instance, the inner conductor 102 could be formed by at least two electrically connected wires or a twisted pair and/or the shield layer 108 could be omitted. In one embodiment, the transmission line 22 is fixedly attached to the outer conductor 110, for example, by welding or otherwise connecting the transmission line 22 to the outer conductor 110. In all of the embodiments that follow it shall be assumed (if not explicitly illustrated) that the transmission line 22 is surrounded, at least at its ends, by an outer conductor and that the two are fixedly coupled to one another at least over a part of the length of the outer conductor.

While not illustrated it shall be understood that the outer conductor 110 can be located within a gun drilled section of the walls of the segments 14 (FIG. 1). In one embodiment, the outer conductor 110 is fixed within the segments.

As illustrated, a connector 100 electrically connects the coupler 34 to the transmission line 22. Disclosed below are alternative connectors. Each connector embodiment is given a different reference numeral (e.g., 100, 200, etc.) but shall generally be referred to as a connector. All of the connectors disclosed herein can be formed in different lengths to accommodate for segment 14 length differences that may occur.

As illustrated in FIG. 4, the coupler 34 includes a coupler connection 120 that extends away from the communication element 124 of the coupler 34. A portion 120a of the coupler connection 120 is shown passing through and extending beyond an optional sealing region 126. The seal region (or stack) 126 provides for seal between the coupler connection 120 and the outer conductor 110.

The portion 120a, in one embodiment, extends into the coupler connector 100. At the opposite end of the coupler connector 100 and end 102a of the inner conductor 102a extends into the coupler connector 100. An internal connection element 130 located on an inner surface of the coupler connector 100 electrically connects portions 120a and 102a. In this manner, the coupler 34 may receive electrical signals from, and provide electrical signals to, the inner conductor 102. As one of ordinary skill will understand, this may allow for a signal at a coupler 34 at one end of a segment 14 to be conveyed to another coupler at another end of the segment 14. Of course, intervening structures (e.g., repeaters) may be disposed between the couplers on either end of the segment 14. As shown, the internal connection element 130 is a solid strip of material. Of course, and as shown below, such is not required and breaks may be introduced into the internal connection element 130 and, in some cases, passive elements such as inductors or capacitors may be formed either in the break or such that they connector portions of the internal connection element 130 on either side of a break.

Figure 5:
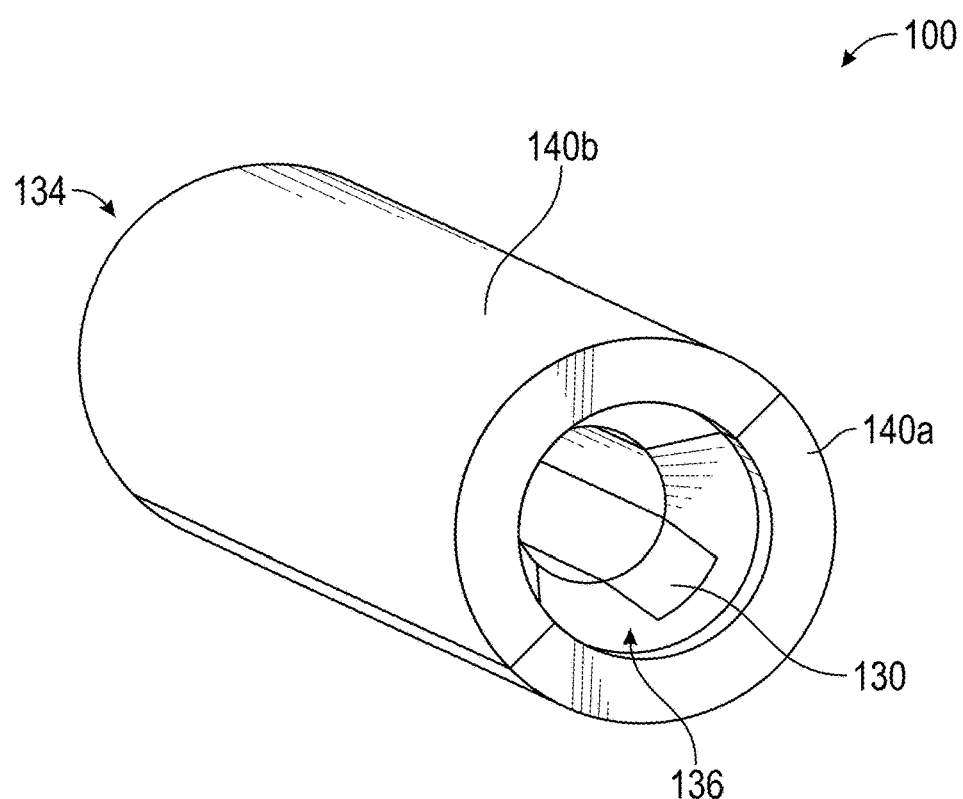
FIG. 5 is perspective view connector according to one embodiment.

FIG. 5 shows a perspective view of a coupler connector 100. The coupler connector 100 is formed of two half shells portions 140a and 140b that, when joined, form a hollow tube. Electrical elements such as the inner conductor 102 and the coupler connection 120 may be inserted into opposite ends (134, 136) of the coupler connector 100 and electrically coupled to one another by internal connection element 130. The half shell portions 140a, 140b could for example be made of PEEK, PFTE, ceramic or any other material that is nonconductive.

Figure 6:
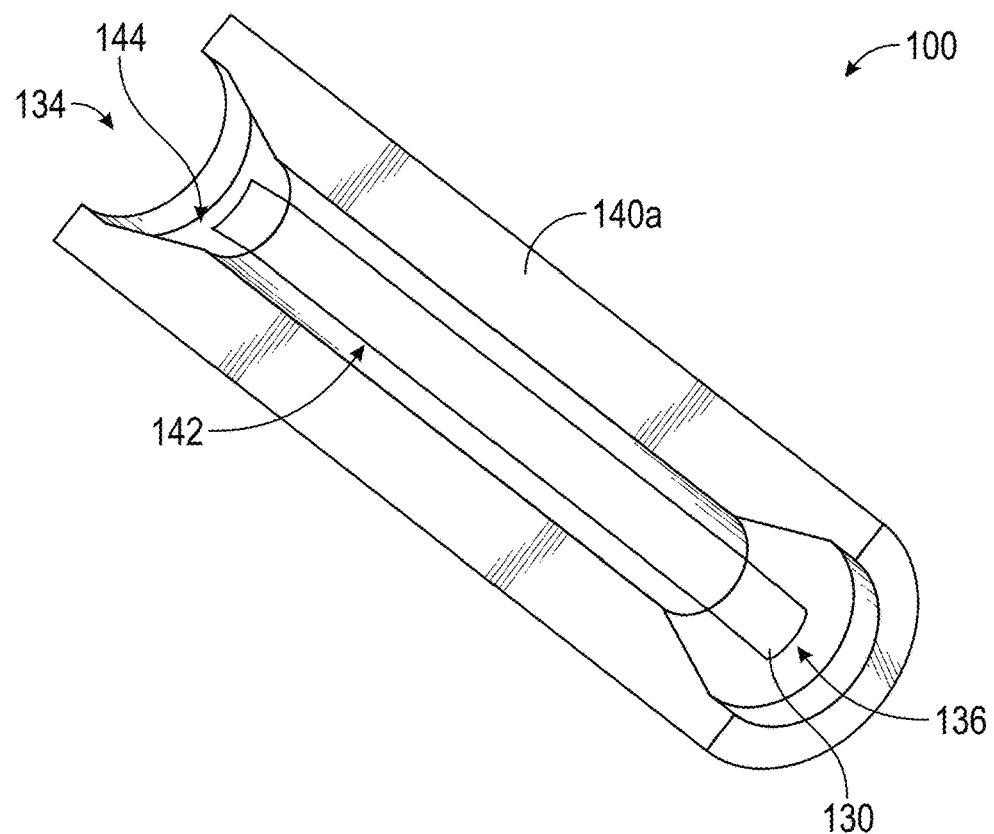
FIG. 6 is a cut-away perspective view of the connector of FIG. 5.

As illustrated in FIG. 6, one of the half shells (in this case 140a) has an internal connection element 130 formed on an inner surface 142 of a trough 144 or other passage way formed therein. In one embodiment, the internal connection element 130 is thin conductive (e.g., metallic) layer formed by Laser Direct Structuring (LDS) Technology. In one embodiment, the internal connection element 130 is formed on only one half shell. In one embodiment, the internal connection element 130 is formed on both. In either, the internal connection element 130 may be formed such that is does not surround any element disposed within the trough 142. For example, the internal connection element 130 may be formed such that when the half shells 140a, 140b are coupled together (as in FIG. 5) and the inner conductor 102 and the coupler connection 120 are inserted into opposite ends (134, 136) of the coupler connector 100 it does not surround either the inner conductor 102 or the coupler connection 120. Of course, in one embodiment, one or both of the inner conductor 102 and the coupler connection 120 could be completely surrounded. For example, in one embodiment, the internal connection element 130 could be formed such that it surrounds the coupler connection 120 but not the inner conductor 102.

Forming an internal connection element 130 may allow for the use of inexpensive high conductive material to be used for the electric contacts. Another advantage is that the internal connection element may be formed such that it includes passive elements such as capacitors or inductors in its conduction path.

Figure 7:
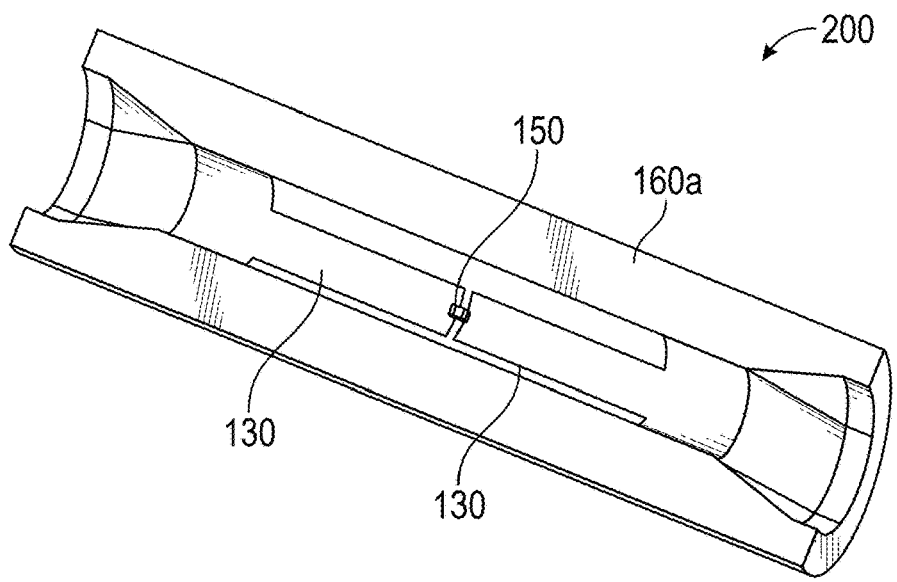
FIG. 7 is a cut-away perspective view of another embodiment of a connector.

For example, FIG. 7 shows a portion of another embodiment of a connector 300. As illustrated, only one half shell 160a is shown. This half shell could be joined, for example, to half shell 140b to form a hollow tube as generally described above. In this embodiment, a passive element 150 is introduced into the conductive path of the internal connection element 130. The element may be, for example, a resistor, a capacitor, an inductor, or another electrical element that may be formed by LDS. Further, more than one element may be provided to form, for example, an impedance matching circuit if such is required. A comparison of FIG. 6 and FIG. 7 illustrates that the internal connection element 130 may extend to different locations within the connector 100/200. A particular location is not required as long as the internal connection element 130 can be electrically coupled to another element disposed at least partially within the connector 100/200.

Figure 8:
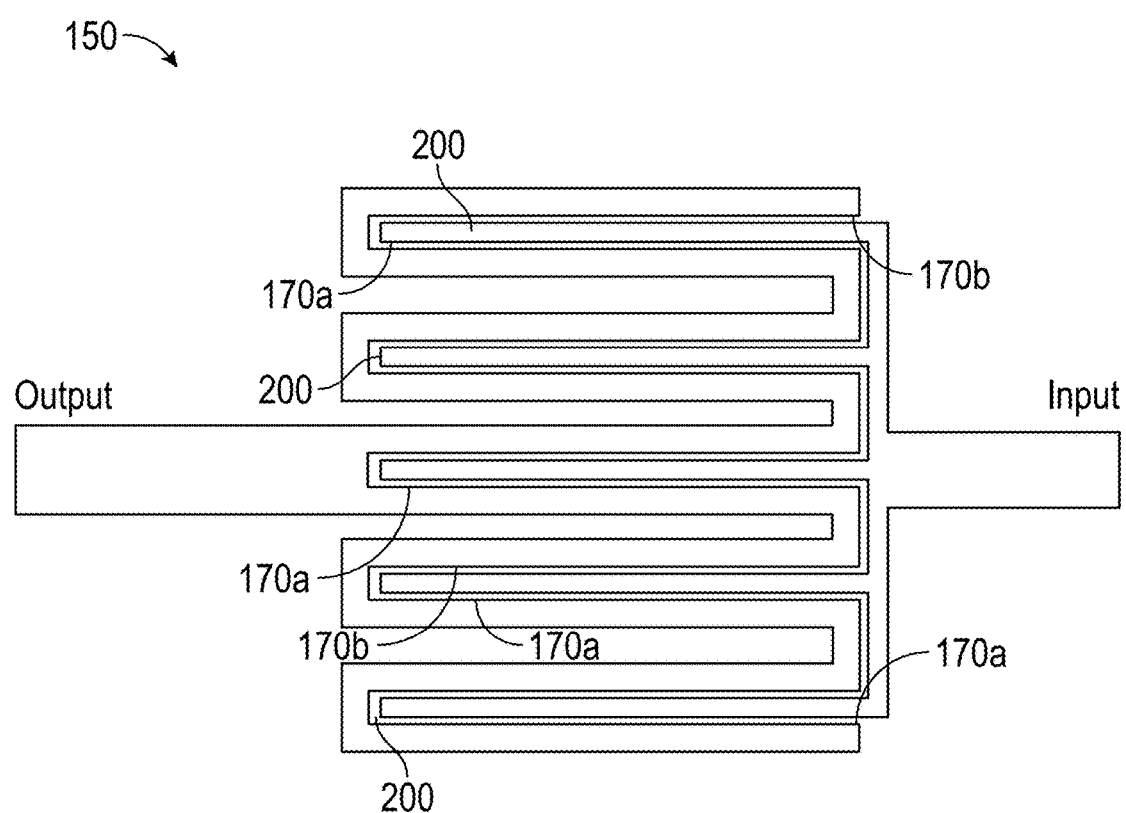
FIG. 8 shows an example of a capacitor made on an internal portion of the connector of FIG. 7.

FIG. 8 shows an example of a passive element 150 formed as a capacitor. The capacitor includes one or more fins 170a/b formed by LDS that serve as capacitor plates. As illustrated, the "input fins" are designated by reference numerals followed by an "a" and the "output fins" are designated by reference numerals followed by a "b". The input and output fins may be made of any type of metallic or other conductive material (e.g., carbon) and may the same as each other or different. In one embodiment, the fins are made of copper or copper alloy. The inner surface 200 of the connector serves to separate the plates and may serve, in combination with air, as dielectric between the plates. Of course, the passive elements disclosed could be formed in any of the connectors disclosed herein.

In any of the embodiments disclosed here, the half shells may be formed such that impacts of force on the electrical connector disposed in either end thereof are handled while still creating a reliable connection in a harsh drilling environment that may include superimposed vibrations. The options to create this clamping force are various and cannot all be described in here, but here are some ideas: crimping of the sleeve, using shape memory material for the sleeve, inserting clamps or shims.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wired pipe segment comprising:
   a body extending from a box end to a pin end;
   a coupler located in one of the box and pin ends, the coupler including a communication element and a coupler connection in electrical communication with the communication element and extending away from the communication element;
   a transmission line extending away from the coupler towards another of the box and pin ends, the transmission line including an inner conductor surrounded by a dielectric material, the inner conductor extending beyond an end of the dielectric material; and
   a hollow connector that electrically connects the coupler to the transmission line, the hollow connector including first and second female ends that respectively receive the inner conductor and a portion of the coupler connection, the hollow connector including an internal connection element formed on an inner surface of the hollow connector, wherein the internal connection element electrically connects the inner conductor and the portion of the coupler connection, wherein the internal connection element is formed such that the internal connection element does not completely surround at least one of the inner conductor and the portion of a coupler connection, the internal connection element including an electrical element formed between the first and second female ends, the electrical element comprising a capacitor;
   wherein the coupler is one of an inductive coupler, a capacitive coupler, an optical coupler, a direct connection and a resonant coupler.

2. The wired pipe segment of claim 1, wherein the hollow connector is formed by a first half shell and second half shell joined together.

3. The wired pipe segment of claim 1, wherein the internal connection element is formed as a conductive strip deposited by laser direct structuring on the first half shell.

4. The wired pipe segment of claim 2, wherein the first and second half shells are formed of a non-conductive material.

5. A wired pipe segment having a connector for use in connecting a communication element of a coupler to an inner conductor of a transmission line in the wired pipe segment, the connector comprising:
   a first female end adapted to surround and make electrical contact with a coupler connection of the coupler;
   a second female end adapted to receive the inner conductor; and
   an internal connection element formed on an inner surface of the connector adapted to electrically connect the coupler connection and the inner conductor, the internal connection element including an electrical element formed between the first and second female ends, the electrical element comprising a capacitor, the internal connection element formed such that the internal connection element does not completely surround at least one of the inner conductor and the coupler connection when the inner conductor is inserted in the first female end and the coupler connection is inserted in the second female end;
   wherein the coupler is one of an inductive coupler, a capacitive coupler, an optical coupler, a direct connection and a resonant coupler.

6. The connector of claim 5, wherein the connector is a hollow connector formed by a first half shell and second half shell joined together.

7. The connector of claim 6, wherein the first and second half shells are formed of a non-conductive material.

* * * * *